July 6, 1965 R. E. WESTERN 3,193,711
STEP-START CIRCUIT
Filed Jan. 18, 1962

INVENTOR
RALPH E. WESTERN
BY
Moody and Harris
ATTORNEYS

United States Patent Office 3,193,711
Patented July 6, 1965

3,193,711

STEP-START CIRCUIT

Ralph E. Western, Cedar Rapids, Iowa, assignor to Collins Radio Company, Cedar Rapids, Iowa, a corporation of Iowa Filed Jan. 18, 1962, Ser. No. 167,068
5 Claims. (Cl. 307—141)

This invention relates to a circuit for effecting the application of electrical power to a load by predetermined increments and more particularly to a circuit for automatically initially reducing energization of a load for a predetermined short period of time.

It is oftentimes desirable to initially couple reduced power to an output load for a short period of time before full power is coupled thereto. Such is frequently the case, for example, when initially energizing the windings of an electric motor or the components of various electronic equipments. It is also oftentimes desirable that such circuits be controlled from a remote location, such as, for example, from the cockpit of an aircraft.

While circuits for effecting the application of power by increments, or step-start circuits as they are sometimes called, are well known in the art, these circuits have proven unsuitable for many applications, being, for example, relatively bulky, dependent upon a plurality of relays, or dependent upon one or more thermostatic switches. In addition, many prior art step-start switches are unsuitable for remotely situated control since the switch when utilized for this purpose would have to be in the main line which is usually undesirable for a remotely situated switch as well as requiring that such a switch have high power capabilities.

It is therefore an object of this invention to provide an improved circuit that is simple and compact for effecting application of electrical power to a load by predetermined increments.

It is another object of this invention to provide an improved circuit for effecting the application of electrical power by predetermined increments utilizing a silicon controlled rectifier.

It is yet another object of this invention to provide a circuit for effecting the application of electrical power by predetermined increments that is well suited for remote control through the use of a low power switch.

With these and other objects in view which will become apparent to one skilled in the art as the description proceeds, this invention resides in the novel construction, combination and arrangement of parts substantially as hereinafter described and more particularly defined by the appended claims, it being understood that such changes in the precise embodiments of the herein disclosed invention may be included as come within the scope of the claims.

The accompanying drawings illustrate two complete examples of the embodiments of the invention constructed according to the best mode so far devised for the practical application of the principles thereof, and in which.

Figure 1:
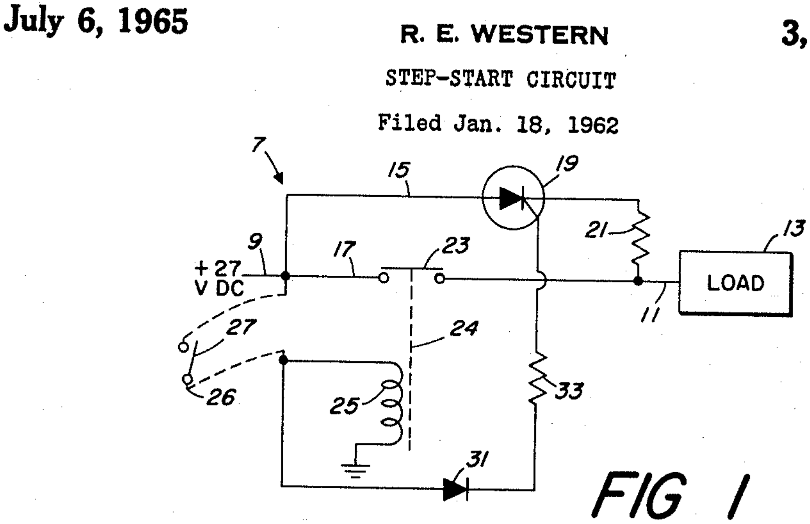
FIGURE 1 is a schematic presentation of one embodiment of the circuit of this invention.

Referring now to the drawings, in which like numerals have been used for like characters throughout, the numeral 7 indicates generally the embodiment of the step-start circuit of this invention shown in FIGURE 1 having an input line 9 adapted for connection to a direct current voltage source (such as +27 volts, for example, which is commonly available on an aircraft) and an output line 11 which may be connected to a load 13 (such as a motor, for example).

Input line 9 is connected to output line 11 by means of auxiliary and main current paths 15 and 17. Auxiliary current path 15, as shown in FIGURE 1, includes a silicon controlled rectifier 19 the anode of which is connected to input line 9 and the cathode of which is connected to one side of voltage limiting resistor 21, the other side of which resistor is connected to output load line 11. Main current path 17 includes a power switch 23 which switch, when closed, directly connects input line 9 and output line 11.

Power switch 23 may be part of relay 24, and, as such, is actuated by relay winding 25, which winding is grounded at one side and connected at its other side to one side 26 of low power switch 27. The other contact of switch 27 is connected to input line 9. In addition, the anode of diode 31 is also connected to side 26 of switch 27, while the cathode of diode 31 is connected through gate current limiting resistor 33 to the gate terminal of the silicon controlled rectifier 19.

Since switch 27 is not located in the main or auxiliary line it need not have high power capabilities and has therefore been referred to herein as a low power switch. Therefore, switch 27 may conveniently be safely located at a remote location, such as, for example, in the cockpit of an aircraft.

Figures 3, 4:
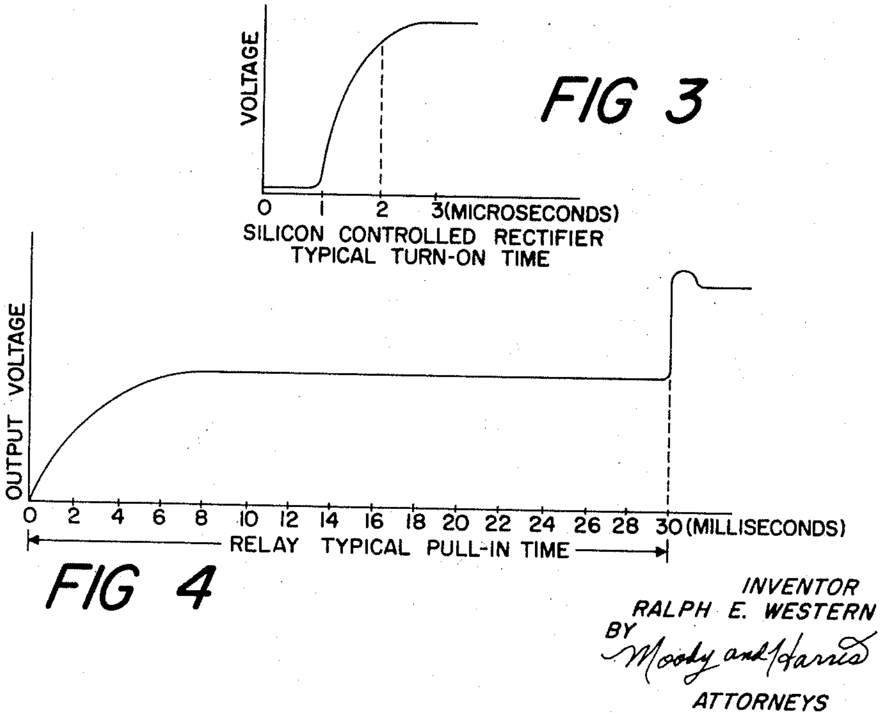
FIGURE 3 is a graphical illustration of the typical turn-on time of a silicon controlled rectifier.
FIGURE 4 is a graphical illustration of the typical application of output power to a load by increments when utilizing the circuit of FIGURE 1.

With direct current power coupled to input line 9 and with switch 27 open, there is substantially no power coupled to output line 11. This is due to the fact that power switch 23 is in a normally open position until actuated by relay winding 25 and silicon controlled rectifier 19 is, as well known in the art, essentially nonconductive until a predetermined minimum voltage is coupled to the gate terminal. The predetermined minimum voltage required to trigger the silicon controlled rectifier into conduction may vary depending upon the individual rectifier utilized and ambient temperatures encountered, between about 1 and 3 volts, but, as shown in FIGURE 3, about 1 volt is the typical requirement at normal temperatures.

When switch 27 is closed, voltage is coupled through diode 31 and resistor 33 to the gate terminal of silicon controlled rectifier 19 and power is also coupled to relay winding 25. Silicon controlled rectifier 19, however, becomes fully conductive in a very short period of time (3 microseconds as shown in FIGURE 3), while the relay pull-in time is comparatively much greater (30 milliseconds, as shown in FIGURE 4).

Current is therefore first coupled through the auxiliary line 15 to the output line 11, and due to the presence of resistor 21, the initial energization of load 13 will be of reduced power. Auxiliary line 15 will continue to supply reduced power to load 13 until the relay pull-in time has elapsed, at which time relay winding 25 closes power switch 23.

Closing of power switch 23 directly connects the input line to the output line and full power is, of course, thereafter coupled to load 13, the auxiliary line being essentially shorted out by the main line. The current carried is dependent upon circuit application, but 50 amps is not unreasonable to expect and highlights the need for maintaining remote controls at a low power level.

When switch 27 is opened, the voltage is removed from the gate electrode of the silicon controlled rectifier and from relay winding 25, which prevents the silicon controlled rectifier from again achieving a conductive state (the rectifier having assumed a non-conductive state when power switch 23 closed) and causes power switch 23 to open, thus blocking current flow from the input line 9 to output line 11.

Figure 2:
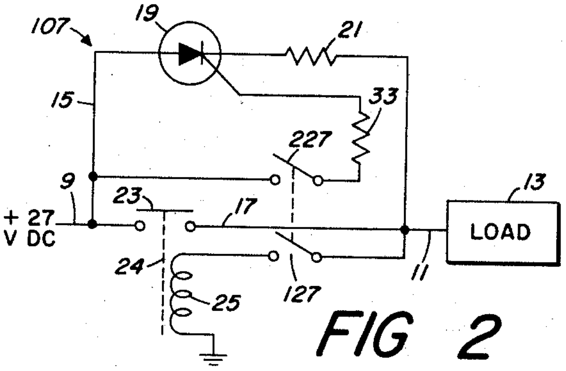
FIGURE 2 is a schematic presentation of a second embodiment of the circuit of this invention.

The numeral 107 refers generally to a second embodiment of the circuit of this invention, as shown in FIGURE 2, wherein a longer time period of applied reduced power is achieved. This is due to the connection of relay winding 25 to output line 11 through low power switch 127 rather than to input line 9 through switch 27 as shown in FIGURE 1. By connection in this manner, the circuit of FIGURE 2 is also able to provide current limiting in case of a short in the load since the winding would be de-energized in response to such a short circuit to block the main line.

As shown in FIGURE 2, the anode and cathode of silicon controlled rectifier 19 are connected in the same manner as described hereinabove with respect to the embodiment of FIGURE 1, while the gate terminal is connected to input line 9 through switch 227 and resistor 33. Switches 127 and 227 are constrained to common movement and, if desired, may be a double pole switch.

The circuit of FIGURE 2 operates in a manner similar to that of the embodiment shown in FIGURE 1. With direct current power supplied to input line 9 and switches 127 and 227 open, there will be no current coupled to output line 11 since the silicon controlled rectifier is in a nonconductive state and power switch 23 is normally open.

Closing of switches 127 and 227 causes voltage to be applied to the gate terminal of silicon controlled rectifier 19 to cause the same to rapidly switch to a conductive state as brought out hereinabove. This permits conduction of reduced power (due to resistor 21) through the auxiliary path 15 to load 13.

If load 13 is a motor, for example, the current through resistor 21 would initially be maximum and then would be reduced as the motor builds up speed. When the current through resistor 21 has reduced sufficiently, relay winding 25 will be sufficiently energized to pull in, or close, power switch 23, which, of course, permits full power transfer through main line 17, auxiliary line 15 again being essentially shorted out by main line 17.

When switches 127 and 227 are opened, the voltage is removed from the gate terminal of silicon controlled rectifier 19 to prevent the rectifier from achieving a conductive state (again the rectifier was caused to assume a nonconductive state when switch 23 closed) to thus block power transfer through the auxiliary line, and relay winding 25 is de-energized to cause power switch 23 to open and thereafter block passage of current through the main line.

The following is a list of particularized components which have been successfully used in a working embodiment of this invention utilizing a +27 D.C. power source:

| Number | Designation | Type or Value |
|---|---|---|
| 19 | Silicon Controlled Rectifier | GE C10-A. |
| 21 | Resistor | 1 ohm. |
| 24 | Relay | C-H 6041H80. |
| 31 | Diode | 1N1487. |
| 33 | Resistor | 820 ohms. |

It is to be appreciated, of course, that the foregoing list is merely illustrative, and this invention is not meant to be limited to the particular designation, values, or types included in said list.

From the foregoing, it should be obvious to one skilled in the art that the step-start circuit of this invention provides an improved means for effecting the initial application of power by predetermined increments that is well suited for actuation from remote locations.

What is claimed as my invention is:

1. A device for effecting the application of electrical power by predetermined increments, said device comprising: input means adapted to receive power from a direct current source; output means adapted to be connected with a load to be energized by increments; a first current path connecting said input means with said output means, said first current path including relay means for delaying the passage of current therethrough for a predetermined amount of time; and a second current path parallel to said first current path, said second current path including a silicon controlled rectifier for permitting passage of current through said second current path substantially before said predetermined amount of time has elapsed and impedance means whereby the resulting application of power through said device is by increments.

2. A device for effecting the application of electrical power by predetermined increments, said device comprising: an input line adapted to be connected to a source of direct current power; an output line adapted to be connected to a load to be energized by predetermined power increments; auxiliary and main electrically parallel current paths connecting said input line with said output line, said auxiliary current path including a silicon controlled rectifier and a resistor connected in series, and said main current path including a power switch; and control means including a relay winding for actuating said power switch, means connected to the gate of said silicon controlled rectifier to control conduction thereof, and switch means to control the operation of said device whereby the closing of said switch means causes said relay winding to be energized said causes passage of reduced current through said auxiliary current path to the exclusion of said main current path for a predetermined period of time until said relay winding actuates said power switch after which current is caused to be passed through said main current path.

3. The device of claim 2 wherein said switch means is remotely situated and has relatively low power handling capabilities.

4. A remotely controlled device for effecting the application of electrical power by predetermined increments, said device comprising: an input line adapted to be connected to a direct current high power source; an output line adapted to be connected to a load to be energized by predetermined increments; an auxiliary current path including a resistor and a silicon controlled rectifier the anode of which is connected to said input line and the cathode of which is connected to one side of said resistor, the other side of said resistor being connected to said output line; a main current path including a power switch in the closed position of which said input line is directly connected to said output line; and control means including a remotely situated low power switch one side of which is connected to said input line, a relay winding for actuating said power switch having one side connected to ground and the other connected to the other side of said low power switch, and gate connecting means including a diode and serially connected resistor connecting said other side of said low power switch with the gate of said silicon controlled rectifier whereby when said low power switch is closed said silicon controlled rectifier is substantially immediately rendered conductive to permit passage of current of reduced magnitude to said output line through said auxiliary line and said power switch is actuated by said relay winding a predetermined period of time after said silicon controlled rectifier is rendered conductive to thereafter permit passage of full power to said output line.

5. A device for effecting the application of electrical power by predetermined increments, said device comprising: an input line adapted to be connected to a source of direct current power; an output line adapted to be connected to a load to be energized by predetermined power increments; an auxiliary current path including a first resistor and a silicon controlled rectifier the anode of which is connected to said input line and the cathode of which is connected to one side of said first resistor, the other side of said first resistor being connected to said output line; a main current path including a power switch in the closed position of which said input line is directly connected to said output line; and control means including a relay winding having one side grounded for actuating said power switch, a second resistor one side of which is connected to the gate of said silicon controlled rectifier, and first and second low power switch means constrained to common movement with said first switch means connecting the other side of said second resistor to said input line and said second switch means connecting the other side of said relay winding to said output line whereby when said low power switch means are closed said silicon controlled rectifier is substantially immediately rendered conductive to permit passage of current through said auxiliary current path to said output line, said power switch being closed by said relay winding to couple full power to said output line only after the current flowing through said auxiliary line reaches a predetermined magnitude.

References Cited by the Examiner

UNITED STATES PATENTS

| | | | |
|---|---|---|---|
| 1,705,728 | 3/29 | Harvey | 317—20 |
| 2,321,798 | 6/43 | Chandler et al. | 318—278 |
| 2,331,256 | 10/43 | Weybrew | 318—58 |
| 2,454,671 | 11/48 | Roberts | 318—278 |
| 3,045,163 | 7/62 | Collom | 318—227 |
| 3,143,694 | 8/64 | Chiasson | 318—227 |

OTHER REFERENCES

Application and Circuit Design Notes, "A Survey of Some Circuit Applications of the Silicon Controlled Switch Rectifier," Solid State Products, Inc., (SSP1) Bulletin D420–02–9–60, pp. 15 and 16.

G.E. Controlled Rectifier Manual, First Edition, 1960, page 70.

LLOYD McCOLLUM, *Primary Examiner.*

UNITED STATES PATENT OFFICE
CERTIFICATE OF CORRECTION

Patent No. 3,193,711 July 6, 1965

Ralph E. Western

It is hereby certified that error appears in the above numbered patent requiring correction and that the said Letters Patent should read as corrected below.

Column 4, line 28, for "said" read -- and --.

Signed and sealed this 30th day of November 1965.

(SEAL)
Attest:

ERNEST W. SWIDER
Attesting Officer

EDWARD J. BRENNER
Commissioner of Patents